United States Patent [19]

Yamazaki

[11] Patent Number: 4,651,217
[45] Date of Patent: Mar. 17, 1987

[54] VIDEO PROJECTOR

[75] Inventor: Eiichi Yamazaki, Ichihara, Japan

[73] Assignee: Hitachi, Ltd., Tokyo, Japan

[21] Appl. No.: 854,681

[22] Filed: Apr. 18, 1986

Related U.S. Application Data

[63] Continuation of Ser. No. 489,740, Apr. 29, 1983, abandoned.

[30] Foreign Application Priority Data

May 10, 1982 [JP] Japan .................................. 57-76737

[51] Int. Cl.$^4$ .............................................. H04N 5/74
[52] U.S. Cl. ..................................... 358/231; 358/60;
358/64; 358/237; 358/239
[58] Field of Search ............... 358/231, 233, 234, 237,
358/238, 239, 245, 252, 254, 60, 62, 64

[56] References Cited

U.S. PATENT DOCUMENTS

| | | | |
|---|---|---|---|
| 2,342,778 | 2/1944 | Wolff | 358/237 |
| 2,522,390 | 9/1950 | McCarthy | 358/237 |
| 2,673,977 | 3/1954 | Epstein | 358/239 |
| 3,429,997 | 2/1969 | Rosner | 358/225 |
| 3,522,367 | 7/1970 | Jones | 358/60 |
| 4,150,320 | 4/1979 | Mitchell | 358/250 |
| 4,245,242 | 1/1981 | Trcka | 358/64 |

FOREIGN PATENT DOCUMENTS

| | | | |
|---|---|---|---|
| 688075 | 6/1981 | Japan | 358/237 |
| 230237 | 12/1984 | Japan | 358/237 |

OTHER PUBLICATIONS

"A New Coolant-sealed CRT for Projection Color TV" by Masahiro Kikuchi et al. presented at IEEE Chicago Spring Conference on Consumer Electronics Jun. 4, 1981.

Primary Examiner—Tommy P. Chin
Attorney, Agent, or Firm—Charles E. Pfund

[57] ABSTRACT

A video projector has a structure wherein a projection lens is disposed to be fixed at a predetermined distance with respect to a front surface of a faceplate of a projection cathode-ray tube through a medium. The medium has substantially the same refractive index as that of the glass used for the faceplate and the projection lens. A resin adhesive, for example, may be used as the medium.

3 Claims, 2 Drawing Figures

VIDEO PROJECTOR

This application is a continuation of application Ser. No. 489,740 filed Apr. 29, 1983, now abandoned.

BACKGROUND OF THE INVENTION

The present invention relates to a video projector and, more particularly, to a video projector of a type wherein a projection lens is disposed in front of a faceplate of a projection cathode-ray tube (CRT) thereof.

A conventional video projector of this type has a structure wherein a projection lens is disposed in front of a faceplate of a projection CRT, and an image is projected from the CRT onto a screen through a reflector as needed.

However, according to the structure described above, in general, the projection CRT is disposed independently of the projection lens. As a result, a predetermined space is formed between the faceplate of the projection CRT and the projection lens (in particular, a first lens thereof). For this reason, some of light beams emitted from the faceplate to the outside are mutually reflected between the first lens and the faceplate. As a result, a sufficient, practical contrast cannot be obtained.

Furthermore, if the optical axis of a projection CRT is not aligned with that of the projection lens (i.e., if the projection CRT is not properly located relative to the projection lens in a predetermined positional relationship), an image cannot be properly focused on the screen. A long period of time is required to accurately locate the optical members, thus resulting in inconvenience.

SUMMARY OF THE INVENTION

It is, therefore, an object of the present invention to provide a video projector with improved contrast as compared with that obtained with a conventional projector.

In order to achieve the above object of the present invention, there is provided a video projector wherein a medium which has substantially the same refractive index as that of a glass used therein is sandwiched between a faceplate of a projection cathode-ray tube and a first lens of a projection lens.

According to an aspect of the present invention, there is provided a video projector including a projection cathode-ray tube and a projection lens disposed spaced apart from said projection cathode-ray tube by a predetermined distance, so as to project video image from said projection cathode-ray tube onto a screen through said projection lens, wherein a medium is sandwiched between said projection cathode-ray tube and said projection lens, said medium having substantially the same refractive index as that of a glass used for said projection cathode-ray tube and said projection lens.

DETAILED DESCRIPTION OF THE PREFERRED EMBODIMENTS

Figure 1:
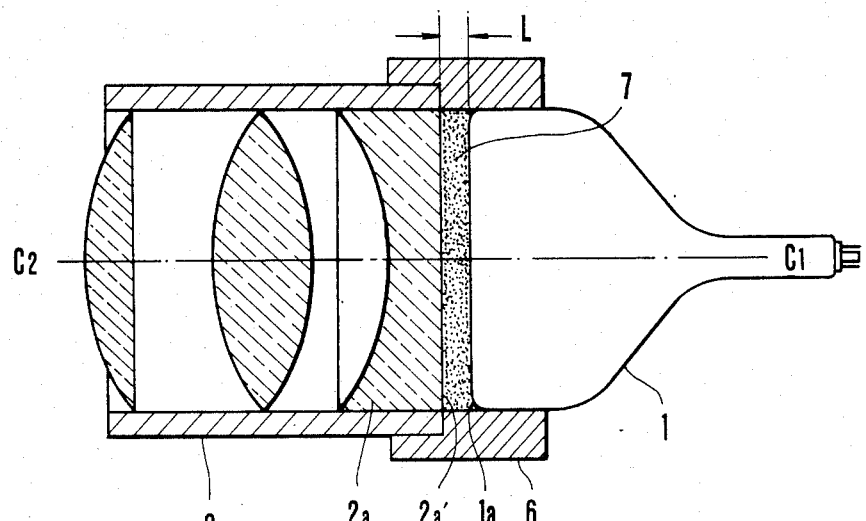
FIG. 1 is a sectional view showing the main part of a video projector according to an embodiment of the present invention.

FIG. 1 illustrates only the main part of a video projector which is directly concerned with the present invention. Referring to FIG. 1, an optical axis of a cathode-ray tube (CRT) 1 having a flat faceplate 1a is aligned with that of a separate projection lens 2 and is spaced apart therefrom by a predetermined distance. The CRT 1 and the projection lens 2 are then sealed and coupled by a frame 6. A medium 7 such as ethylene glycol, diester oil, alkylbenzene and diethylene glycol is sealed between a surface 1a of a glass faceplate of the CRT 1 and a planar surface 2a' of a first, glass plano-concave lens 2a of the projection lens 2. The medium 7 serves as a coolant of the CRT 1. The medium 7 has substantially the same refractive index as that of the glass used as a material for the faceplate and the projection lens 2. A central axis C1 of the CRT 1 is aligned with a central axis C2 of the projection lens 2 along the same optical axis. A distance L between a phosphor screen on the inner surface of the faceplate of the CRT 1 and the surface 2a' is a very important factor in focusing on the screen. In order to guarantee or maintain the proper distance L, the CRT 1 must be firmly fixed by the frame 6 relative to the projection lens 2 before the medium 7 is sealed therebetween.

Since the medium 7 which is sealed between the surface 1a of the faceplate of the CRT 1 and the surface 2a' of the first lens 2a of the projection lens 2 has substantially the same refractive index as the glass used, mutual reflection between the surface 1a of the faceplate of the CRT 1 and the surface 2a' of the first lens 2a of the projection lens 2 can be substantially eliminated.

Further, since the distance L is guaranteed by the frame 6 which is mounted on the faceplate of the CRT 1 and the first lens 2a of the projection lens 2, the surface 1a is easily aligned parallel with the surface 2a' at the time of assembly, thereby properly focusing light on the screen.

Figure 2:
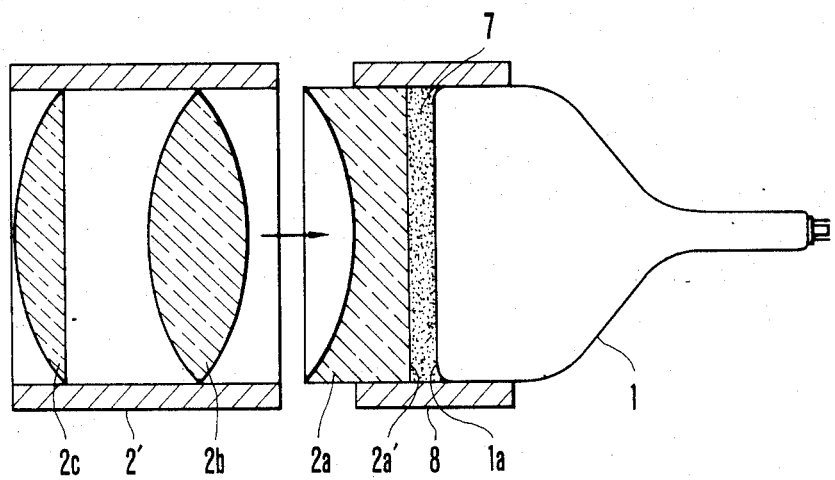
FIG. 2 is a sectional view showing the main part of a modification of the video projector shown in FIG. 1.

FIG. 2 illustrates a modification of the video projector shown in FIG. 1. The video projector shown in FIG. 2 has substantially the same structure as that shown in FIG. 1, except that only the first lens 2a of the projection lens 2 is fixed by a frame 8 relative to the surface 1a through the medium 7 having substantially the same refractive index as that of the glass used, and that an auxiliary lens 2' comprising a second lens 2b and a third lens 2c and which excludes the first lens 2a is movably disposed with respect to the concave surface of the first lens 2a.

The video projector shown in FIG. 2 provides the same effect as the FIG. 1 embodiment thereof.

It should be noted that the medium 7 sealed between the CRT 1 and the projection lens 2 has substantially the same refractive index as that of the glass used, and may be selected from the materials as previously mentioned.

In summary, according to the present invention, mutual reflection between the CRT 1 and the projection lens 2 can be eliminated, so that the projection contrast is greatly improved, thereby providing a clear video image.

In addition, not only glass but also plastic materials like acrylic resin, methacrylic resin and styrene resin may be used respectively for the first lens 2a of the projection lens 2. Methyl methacrylate, for example, has a refractive index of 1.49, cyclohexyl methacrylate 1.56 and styrene 1.59 compared with 1.4–2.0 of glass, and a lens made of any such plastic resin replacing the glass lens, therefore, materializes the same effect as the embodiment described above.

What is claimed is:

1. A video projector comprising a glass projection cathode-ray tube having a flat glass faceplate of predetermined index of refraction, a projection lens comprised of a glass having substantially the same index of refraction as that of the flat faceplate of the cathode-ray tube, said glass projection lens having a flat surface and a concave surface, a spacer supporting the cathode-ray tube and projection lens spaced apart a predetermined distance in relation to each other with their centers on a common central axis and with the flat faceplate of the cathode-ray tube and the flat surface of the projection lens in confronting spaced-apart relation to each other such that the confronting surfaces of the flat surface of the faceplate and the flat surface of the projection lens define a space therebetween of predetermined width and a continuous liquid medium sealed between and filling said space between said surfaces and in direct contact with said surfaces, said liquid medium having substantially the same index of refraction as that of the glass of the flat faceplate of the cathode-ray tube and the glass of the projection lens.

2. A video projector according to claim 1 wherein said medium is selected from the group consisting of ethylene glycol, diethylene glycol, diester oil and alkylbenzene.

3. A video projector according to claim 1 comprising a phosphor screen on the inner surface of the faceplate of the cathode-ray tube.

* * * * *